United States Patent
Harwood et al.

(10) Patent No.: US 7,719,462 B2
(45) Date of Patent: May 18, 2010

(54) TIME-OF-FLIGHT RADAR CALIBRATION SYSTEM

(75) Inventors: Shaun Philip Harwood, Peterborough (CA); George Quinton Lyon, Peterborough (CA)

(73) Assignee: Siemens Milltronics Process Instruments, Inc., Peterborough (CA)

( * ) Notice: Subject to any disclaimer, the term of this patent is extended or adjusted under 35 U.S.C. 154(b) by 0 days.

(21) Appl. No.: 12/221,943

(22) Filed: Aug. 7, 2008

(65) Prior Publication Data

US 2009/0079618 A1 Mar. 26, 2009

(30) Foreign Application Priority Data

Aug. 10, 2007 (EP) .................... 07015781

(51) Int. Cl.
*G01S 7/40* (2006.01)
*G01S 13/00* (2006.01)

(52) U.S. Cl. ................ 342/174; 342/5; 342/6; 342/165; 342/173; 342/175

(58) Field of Classification Search ........... 342/5–11, 342/165–175, 195, 118–127, 82–103
See application file for complete search history.

(56) References Cited

U.S. PATENT DOCUMENTS

| | | | | |
|---|---|---|---|---|
| 2,549,131 A * | 4/1951 | Rideout | ................ | 342/165 |
| 2,549,385 A * | 4/1951 | Rapuano | ................ | 342/173 |
| 2,763,858 A * | 9/1956 | Fairbank | ................ | 342/173 |
| 2,781,511 A * | 2/1957 | Pear, Jr. | ................ | 342/172 |
| 2,961,654 A * | 11/1960 | Simon | ................ | 342/165 |
| 3,103,010 A * | 9/1963 | Heyser et al. | ................ | 342/171 |
| 3,108,275 A | 10/1963 | Chisholm | | |
| 3,109,173 A * | 10/1963 | Hoffman et al. | ................ | 342/172 |
| 3,165,742 A * | 1/1965 | Taylor | ................ | 342/169 |
| 3,172,105 A * | 3/1965 | Schwab | ................ | 342/172 |
| 3,199,107 A * | 8/1965 | Mills | ................ | 342/170 |
| 3,329,953 A | 7/1967 | Adams | | |
| 3,825,931 A | 7/1974 | Gonzalez | | |
| 4,245,221 A | 1/1981 | Johnson | | |
| 4,683,473 A | 7/1987 | Haugland | | |
| 4,737,791 A * | 4/1988 | Jean et al. | ................ | 342/124 |
| 4,847,623 A * | 7/1989 | Jean et al. | ................ | 342/124 |
| 5,406,842 A | 4/1995 | Locke | | |
| 6,400,311 B1 * | 6/2002 | Kolbli et al. | ................ | 342/118 |
| 6,731,236 B1 * | 5/2004 | Hager et al. | ................ | 342/174 |
| 7,075,479 B2 * | 7/2006 | Andersson | ................ | 342/124 |
| 7,088,285 B2 * | 8/2006 | Smith | ................ | 342/124 |
| 7,215,298 B1 * | 5/2007 | Fraschilla et al. | ................ | 342/174 |
| 7,482,971 B2 * | 1/2009 | Lyon | ................ | 342/174 |
| 2005/0264440 A1 * | 12/2005 | Smith | ................ | 342/124 |

FOREIGN PATENT DOCUMENTS

| | | |
|---|---|---|
| EP | 1231480 A2 | 8/2002 |
| EP | 1770409 A1 | 4/2007 |

* cited by examiner

*Primary Examiner*—Bernarr E Gregory

(57) ABSTRACT

A time-of-flight calibration system for a radar-based measurement device is provided. The time-of-flight calibration system includes a target antenna and a waveguide, e.g. a coaxial cable. The waveguide is coupled at one end to the target antenna and terminated at its other end by a wave-reflecting impedance.

13 Claims, 3 Drawing Sheets

TIME-OF-FLIGHT RADAR CALIBRATION SYSTEM

CROSS REFERENCE TO RELATED APPLICATIONS

This application claims priority of European Patent Office application No. 07015781.3 EP filed Aug. 10, 2007, which is incorporated by reference herein in its entirety.

FIELD OF INVENTION

The present invention relates to a time-of-flight calibration system for a radar-based measurement device.

BACKGROUND OF INVENTION

Time-of-flight ranging systems are commonly used in level measurement applications for determining the distance to a reflective surface of a material, such as liquid, slurry or solid, by measuring the time of flight from a transmitted signal to a return signal or echo. From this time, the distance or level is determined. Pulse radar devices emit microwave pulses at a fixed repetition rate. Reflected echoes are detected and digitally converted to an echo profile. The echo profile is then analyzed to determine the distance to the material surface. FMCW (Frequency Modulated Continuous Wave) radar devices send continuously frequency-modulated microwaves to the surface of the material. At the same time, the reflected microwaves are continuously received and the difference in frequency between the transmitted and the received microwaves is directly proportional to the distance to the material.

SUMMARY OF INVENTION

To calibrate a radar level measurement device, it is important to check both that it measures accurately and that signal levels and noise floor are within predetermined specifications. All this requires a large testing area, preferable an anechoic room with automated targets which appear and disappear at precise known distances, thus allowing to measure at near ranges as well as at farther ranges. As the area around the targets must be free of any other reflectors, the required dimensions can become quite large for indoor facilities. Indoor calibration, however, is preferred in order to maintain production throughput and not to expose the moving targets to weather conditions. The control of moving the targets must be carefully designed to maintain accuracy. Further, the distances need to be measured periodically, usually on a daily basis, if the calibration system is used in production.

Thus, following calibration requirements can be defined:
The transmitted radar signals must be returned faithfully as if from a reflector at a precisely known distance.
The calibration measurement must be free of undesirable target effects such as refraction, misalignment, vibration and near field effects.
The distances should not be sensitive to environmental effects such as temperature and humidity.
The calibration range should cover the complete measuring range for which the respective measurement device is specified.
The calibration area should be free of unwanted reflectors and multipath effects so that the measurement device only sees the target reflector at a precisely known distance.
The calibration facility should be as small as possible and easy to access and operate.

According to the invention these requirements are met by a time-of-flight calibration system for a radar-based measurement device comprising a target antenna and a waveguide coupled at one end to said target antenna and terminated at its other end by a wave-reflecting impedance.

The target antenna captures the radar signal emitted by the measurement device under test and the waveguide leads the captured signal to the wave-reflecting impedance. There, the signal is reflected and transmitted back on the same way via the waveguide and the target antenna to the measurement device.

The wave-reflecting impedance represents the actual calibration target, so that the target antenna can be arranged much nearer to the measurement device than a conventional calibration target. Therefore, the impact of environmental conditions on the calibration can be largely avoided. Other calibration disturbances which may result from imperfects and other irregularities of the target antenna, waveguide or wave-reflecting impedance and the connections therebetween are less random and can be better identified and corrected when evaluating the calibration echo in the device under test. For example, temperature effects can be countered quite simply by control of the temperature in a chamber where the waveguide is kept.

When calibrating in the near range, artifacts, e.g. multiple reflections, from the target antenna and from the junction between the target antenna and the waveguide can interfere with the wanted echo from the wave-reflecting impedance. To reduce these disturbances, an impedance matching attenuator is inserted at the one end of the waveguide. The impedance matching avoids multiple reflection.

For calibrating the device under test at different distances, the terminated waveguide can be removably connected to the target antenna and may be replaced by a shorter or longer one. Alternatively, the target antenna and terminated waveguide as a whole may be replaced. Finally, other nearer targets than that represented by the wave-reflecting impedance at the end of the waveguide can be simulated by inserting at least one mismatch impedance in the waveguide at a position between its ends. This mismatch impedance causes a partial reflection, whereas the larger portion of the signal is transmitted through the mismatch to be reflected later at the end of the waveguide.

To obtain a compact design and to save space, the waveguide may be wound, folded or laid along the floor, a wall or ceiling. In this connection, the waveguide preferably comprises of a flexible transmission line, such as a coaxial cable. A cable is usually preferred at low frequencies where the signal bandwidth is a large fraction of the transmitted frequency. This is because coaxial cables are non dispersive and so do not change the shape of the reflection. If a waveguide is used that is dispersive (i.e. different frequencies travel at different speeds) the shape of the reflection changes with distance as the different frequencies spread out in time. It may even happen that a single reflection becomes two or more; usually it just gets broader. If a very high frequency is used and the signal bandwidth is a small fraction of the carrier frequency, the pulse deformation may be small enough to be calibrated out and a hollow or dielectric filled waveguide may be usable.

The target antenna can be of any type compatible with the measurement device under test comprises one of a horn antenna, a rod antenna, a patch antenna, an array antenna etc. If used in time domain reflectrometry (TDR) applications, the target antenna comprises a coupling member for directly coupling to the probe rod of the TDR measurement device under test.

BRIEF DESCRIPTION OF THE DRAWINGS

The invention will be now described by way of example and with reference to the accompanying drawing, in which.

DETAILED DESCRIPTION OF INVENTION

Figure 1:
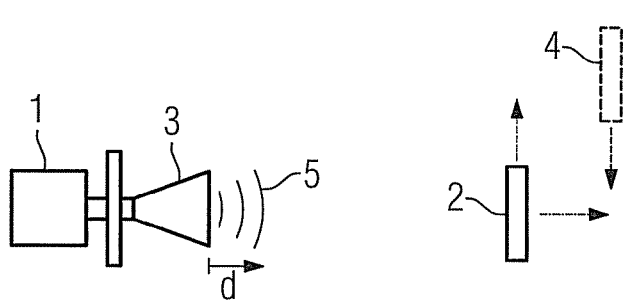
FIG. 1 exemplarily shows a time-of-flight radar calibration system according to the state of the art.

FIG. 1 shows a radar level measurement device 1, e.g. a pulse echo radar, to be calibrated. A calibration target 2 is placed in front of the antenna 3 of the device 1 at a predetermined distance therefrom. For calibrating the device 1 at another, different distance, the target 2 may be moved (dash-dotted arrow) correspondingly or it may be removed from the radar coverage area and another target 4 may be positioned at that new position (dashed arrows). The level measurement device 1 emits a pulsed radar signal 5, e.g. a burst signal, the echo of which, when returning from the target 2 (or target 4), is received and evaluated in the device 1.

Figure 2:
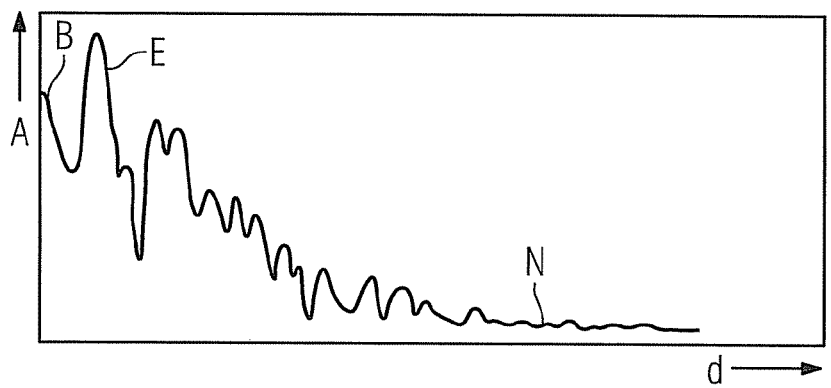
FIG. 2 shows an echo response received in the system of FIG. 1.

FIG. 2 shows the echo response or echo signal received by the device 1 under test as a function of the signal strength A over the distance d. The shown echo signal results from a short-range measurement where the emitted burst signal B is shortly followed by the echo E from the target 2 and multiple reflections M between the antenna 3 and the target 2. Gradually, the echo signal decays to noise level N. When the target 2 is moved aside and target 4 is positioned in the radar coverage area, the echo E will move to the right in FIG. 2 indicating a larger delay from the longer distance.

Figure 3:
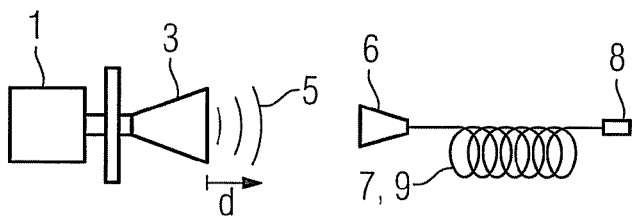
FIGS. 3 and 4 show a first embodiment of the calibration system according to the invention adapted for far-range calibration and an echo response received in this system, respectively.

FIG. 3 shows a first embodiment of the calibration system according to the invention. The target 2 shown in FIG. 1 is replaced by a target antenna 6 and a waveguide 7 coupled at one end to said target antenna 6 and terminated at its other end by a wave-reflecting impedance 8. The wave-reflecting impedance 8 represents the actual calibration target, so that the target antenna 6 can be arranged much nearer to the measurement device 1 than the conventional calibration target 2. The waveguide 7 comprises a coaxial cable 9 which is coiled into a flat spiral.

Figure 4:
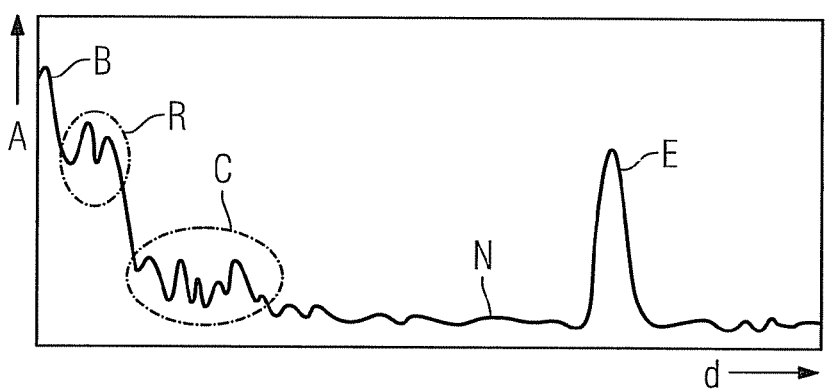

FIG. 4 shows the echo signal received by the device 1 in the calibration system of FIG. 3. This echo signal is not identical to a free space captured signal because there are reflections R from the target antenna 6 and disturbances C similar to clutter originating from imperfections of the waveguide 7. In the shown example, the wanted echo E is far away from the cable clutter C and the target antenna disturbances R so that it can serve as a good reference.

Figure 5:
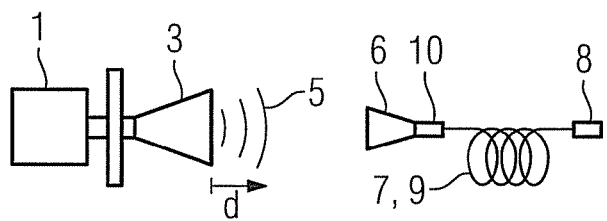
FIGS. 5 and 6 show the first embodiment of the calibration system adapted for short-range calibration and a received echo response, respectively.

FIG. 5 shows the calibration system of FIG. 1 in a modification which is especially suited for near range calibration where the cable clutter C (see FIG. 4) may interfere with the wanted echo E from the wave-reflecting impedance 8. An impedance matching attenuator 10 is inserted at the beginning of the waveguide 7 for attenuating the clutter C.

Figure 6:
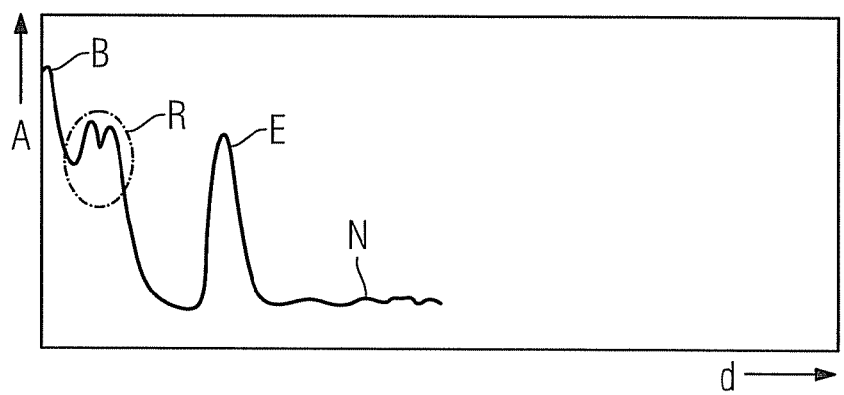

FIG. 6 shows the corresponding echo response. When even the target antenna reflections R interfere with the wanted echo E, the conventional calibration system shown in FIGS. 1 and 2 may be preferred.

With two (simulated) targets, one near and one far, it is possible to calibrate the radar device 1. The offset distance and velocity are calculated. These two variables are required for a linear calibration. In both a pulse and CWFM radar system the slope or velocity calibration is required to correct any errors in the system clock. The offset correction takes into account any delays in sampling, in the antenna 3 and in cables leading to and from the antenna 3. More targets may be used to minimize errors in a linear system or to computationally compensate for non-linear calibration characteristic of the radar device 1.

Figure 7:
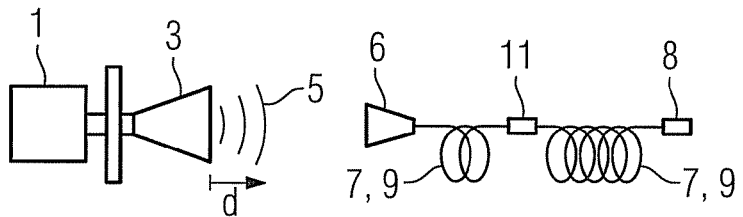
FIGS. 7 and 8 show a second embodiment of the calibration system according to the invention and an echo response received in this system, respectively.

Another configuration that allows the same calibration system to be used for calibrating the level measurement device at different distances is shown in FIG. 7. Here, the waveguide 7 has a mismatch impedance 11 in-line that is slightly different to the characteristic impedance of the waveguide 7. The mismatch impedance 11 causes a reflection partial reflection, whereas the larger portion of the signal is transmitted through the mismatch to be reflected later at the end of the waveguide 7.

Figure 8:
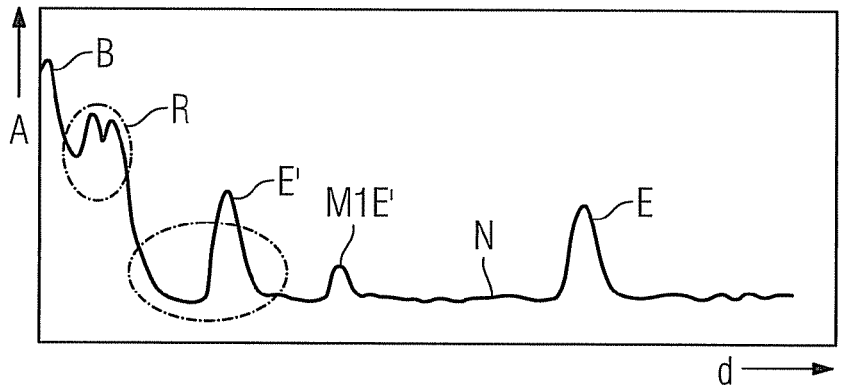

FIG. 8 shows that the wanted echo E from the impedance 8 and the wanted echo E' as well as the multiple echo MIE from the impedance 11 are clearly separated.

Figure 9:
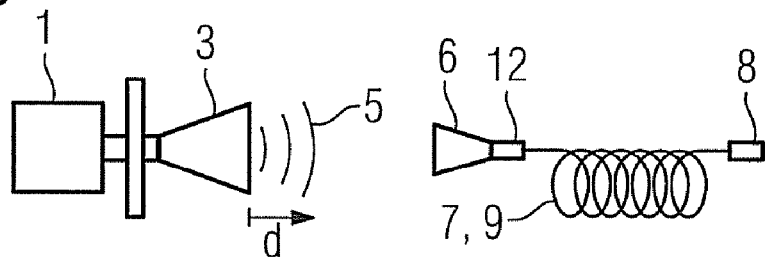
FIGS. 9 and 10 show a third embodiment of the calibration system according to the invention and an echo response received in this system, respectively.

Yet another configuration, as shown in FIG. 9, uses multiple reflections from a single waveguide 7 without the need for interruptions along its length. In this case the target antenna 6 itself or a mismatch impedance 12 at the beginning of the waveguide 7 cause that some of the signal energy returning from the wave-reflecting impedance 8 at the end of the waveguide 7 is repeatedly reflected between the wave-reflecting impedance 8 and the target antenna 6 to present more than one target.

Figure 10:
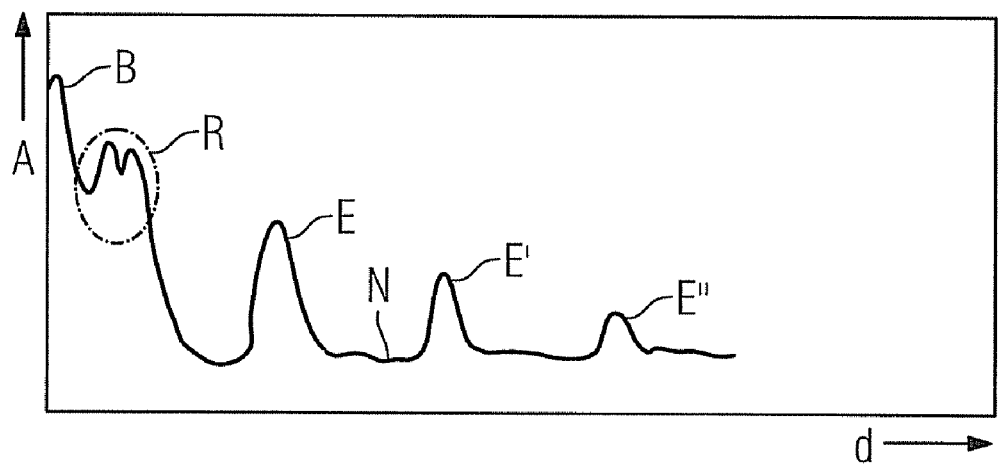

FIG. 10 shows the corresponding echo response having several wanted echoes E, E' and E".

Although the invention has been described with reference to pulse-echo ranging systems, it is applicable to other echo ranging systems capable of generating a return echo profile, for example microwave continuous wave frequency modulated (CWFM) systems.

The invention claimed is:

1. A time-of-flight calibration system for calibrating a radar measurement device based on an echo signal response comprising:
   a radar measurement device configured to transmit a radar signal towards a target system spaced apart from the radar measurement device, wherein the target system comprises:
   a target antenna electromagnetically coupled to receive over-the-air the radar signal from the radar measurement device;
   a waveguide connected at a first end to the target antenna; and
   a wave-reflecting impedance connected at a second end of the waveguide, wherein the wave-reflecting impedance is arranged to reflect the radar signal received from the radar measurement device to form a reflected signal, wherein the target antenna transmits back to the radar measurement device the reflected signal formed by the wave-reflecting impedance, wherein a signal transmitted back to the radar measurement device by the target antenna contains the echo signal response from the target system, wherein a location of the wave-reflecting impedance corresponds to a target distance from the radar measurement device being calibrated based on the echo response from the target system.

2. The calibration system according to claim 1, wherein a mismatch impedance is inserted in the waveguide at a position between the first and second ends.

3. The calibration system according to claim 2, wherein a mismatch impedance is inserted in the waveguide at a position between the first and second ends.

4. The calibration system according to claim 3, wherein the waveguide is wound or folded into a compact shape.

5. The calibration system according to claim 4, wherein the waveguide comprises a coaxial cable.

6. The calibration system according to claim 2, wherein the target antenna comprises a coupling member for directly coupling to a probe rod of a time domain reflectrometry device.

7. The calibration system according to claim 1, wherein for short-range calibration, an impedance matching attenuator is inserted at the first end the waveguide.

8. The calibration system according to claim 7, wherein the target antenna comprises a coupling member for directly coupling to a probe rod of a time domain reflectrometry device.

9. The calibration system according to claim 1, wherein the waveguide is wound or folded into a compact shape.

10. The calibration system according to claim 9, wherein the target antenna comprises a coupling member for directly coupling to a probe rod of a time domain reflectrometry device.

11. The calibration system according to claim 1, wherein the waveguide comprises a coaxial cable.

12. The calibration system according to claim 1, wherein the target antenna comprises a horn antenna, a rod antenna, a patch antenna or an array antenna.

13. The calibration system according to claim 1, wherein the target antenna comprises a coupling member for directly coupling to a probe rod of a time domain reflectrometry device.

* * * * *